Figure 1:
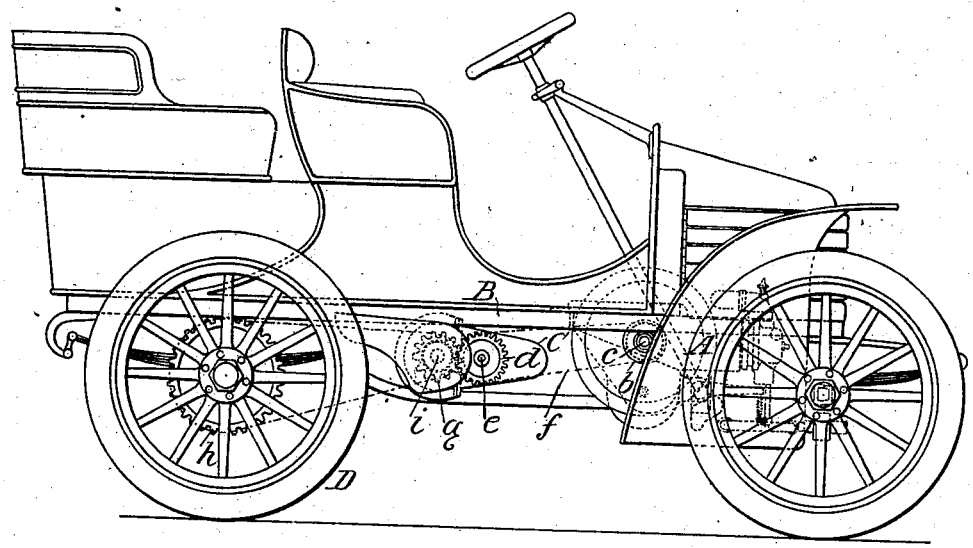

No. 721,413. PATENTED FEB. 24, 1903.
H. AUSTIN.
MOTOR CAR.
APPLICATION FILED APR. 23, 1902.
NO MODEL.

WITNESSES
INVENTOR
Herbert Austin
By Henry Connett
Attorney.

UNITED STATES PATENT OFFICE.

HERBERT AUSTIN, OF ERDINGTON, NEAR BIRMINGHAM, ENGLAND.

MOTOR-CAR.

SPECIFICATION forming part of Letters Patent No. 721,413, dated February 24, 1903.

Application filed April 23, 1902. Serial No. 104,409. (No model.)

*To all whom it may concern:*

Be it known that I, HERBERT AUSTIN, engineer, a subject of the King of Great Britain, residing at Erdington, near Birmingham, England, have invented certain new and useful Improvements in Motor-Cars, of which the following is a specification.

This invention has for its object an improved combination of mechanism for use in the propulsion of a motor-car.

The above object is accomplished according to this invention in the manner shown in the drawings herewith, of which—

Figure 2:
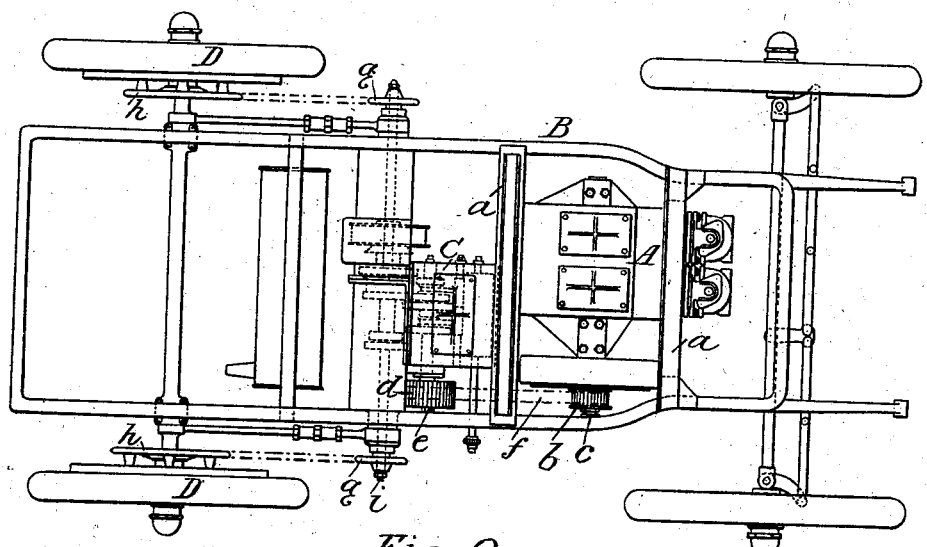

Figure 1 is a side elevation of a motor-car, showing the improved combination of mechanism; and Fig. 2 is a plan of the car with the body removed to expose the mechanism.

A horizontal motor A, having the axis of its shaft transverse to the longitudinal axis of the car and which is preferably duplex, as shown, is carried by transverse bearers $a$ of the framing B of the car. A chain-wheel $b$ on one end of the motor-shaft $c$ drives a chain-wheel $d$ on a shaft $e$ through the medium of a chain $f$. The shaft $e$ is carried in bearings of a box C. This shaft $e$ answers to the shaft which is usually or frequently employed to carry the change-speed wheels, which are slid into and out of gear, respectively, with and from wheels of a parallel shaft $i$, which is formed in two lengths geared together by differential or balance gear of any usual or convenient construction, except that in this case the shafts $e$ and $i$ are transverse to the longitudinal axis of the car instead of parallel therewith, as is usual. The shaft $i$, which is thus driven from the shaft $e$, has mounted on its ends sprocket-wheels $g$, which are geared, respectively, by chains with sprocket-wheels $h$ of the road driving-wheels D.

Having fully described my invention, what I claim, and desire to secure by Letters Patent, is—

A motor car or vehicle having a motor with its shaft $c$ extending transversely of the axis of the vehicle, an intermediate or counter shaft $e$, parallel with the motor-shaft, chain-wheels $b$ and $d$ on the respective shafts, a chain $f$ embracing said wheels through which the motor-shaft drives the counter-shaft, the shaft $i$ parallel with the motor-shaft and in two alined lengths or parts, balance-gear connecting the parts of shaft $i$, sprocket-wheels $g$ on the respective lengths of the shaft $i$, sprocket-wheels $h$ on the respective hind wheels of the vehicle, and chains for driving connecting the respective wheels $g$ and $h$, substantially as set forth.

In witness whereof I have hereunto signed my name, this 8th day of April, 1902, in the presence of two subscribing witnesses.

HERBERT AUSTIN.

Witnesses:
 ROBERT G. GROVES,
 THOMAS EDWIN CARLESS.